Nov. 4, 1930.   C. G. CURTIS ET AL   1,780,175
TWO-CYCLE INTERNAL COMBUSTION ENGINE
Filed March 17, 1928   3 Sheets-Sheet 1

Nov. 4, 1930.  C. G. CURTIS ET AL  1,780,175

TWO-CYCLE INTERNAL COMBUSTION ENGINE

Filed March 17, 1928   3 Sheets-Sheet 3

Charles G. Curtis and
Earle R. Newton
INVENTORS

BY Gustav R. Thompson
ATTORNEY

Patented Nov. 4, 1930

1,780,175

UNITED STATES PATENT OFFICE

CHARLES G. CURTIS, OF NEW YORK, AND EARLE R. NEWTON, OF JAMAICA, NEW YORK

TWO-CYCLE INTERNAL-COMBUSTION ENGINE

Application filed March 17, 1928. Serial No. 262,354.

This invention relates to two-cycle internal combustion engines of the port scavenged type, and provides a novel combination and arrangement of air inlet ports for scavenging and supercharging such engines.

The object is to improve the scavenging efficiency. A further object is to improve the scavenging efficiency by the use of a minimum of air at relatively low pressure. This results in a possibly higher mean effective pressure and a higher overall engine efficiency.

The invention comprehends the use of "skew" inlet ports; that is, ports turned to direct their air streams back toward the side of the cylinder wall in which the inlet ports are located. The use of air ports directing their streams to that side of the cylinder is not new.

Research and experiment by the applicants, have proven that a material improvement is to be had if the ports in the middle portion of the bank, which are more nearly radial, are turned obliquely upward and the ports at the ends of the bank are made more or less horizontal and on the "skew".

Several alternative arrangements embodying the invention are set forth in the drawings and specification, and comprising amongst such arrangements the use of the middle ports for both scavenging and supercharging.

Figure 1:
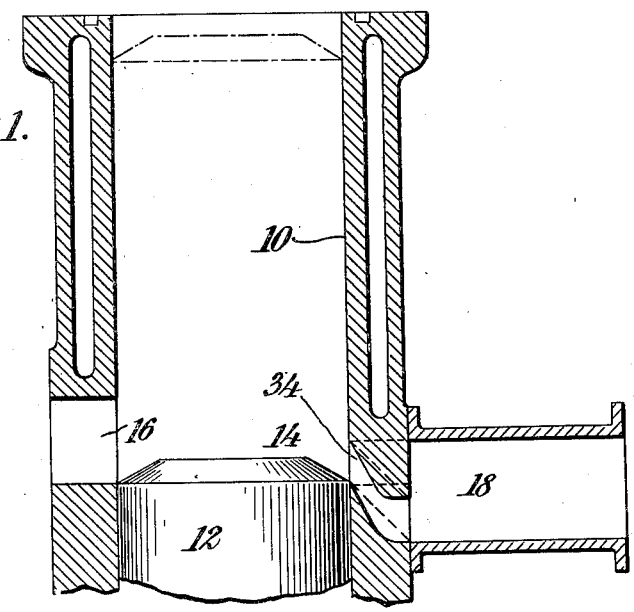
Figure 1 is a sectional elevation of a single-acting engine cylinder, operating on an atmospheric pressure cycle.
Figure 4:
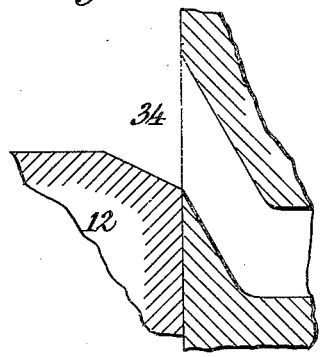
Figure 5:
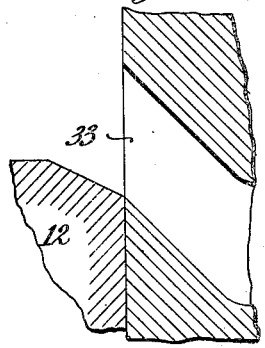
Figure 6:
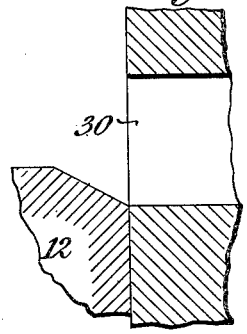

Figs. 4 to 6, inclusive, are enlarged diagrams showing the arrangement of ports as in Fig. 1, Fig. 4 being a section through the middle port;

Fig. 5 being a section through one of the adjacent ports; and

Fig. 6 being a section through one of the end ports.

Figure 7:
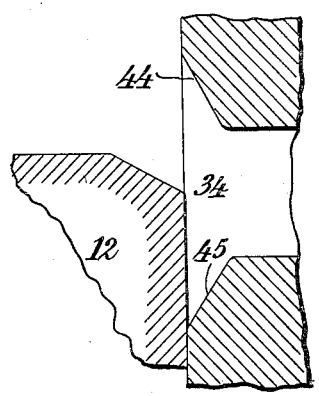
Figure 8:
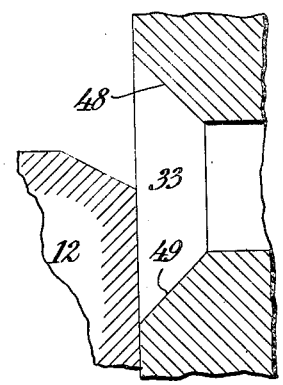
Figure 9:
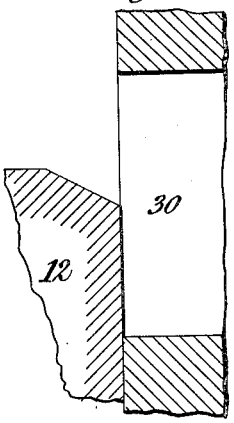

Figs. 7, 8 and 9 show an adaptation for a double-acting engine cylinder,

Fig. 7 being a section through the middle port;

Fig. 8 being a section through one of the two ports adjacent the middle port; and Fig. 9 being a section through an end port.

Figure 2:
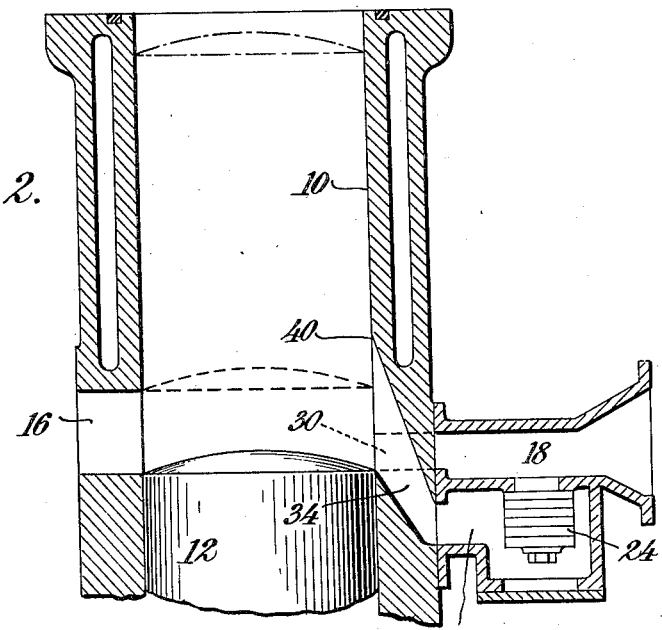
Fig. 2 shows the same general port arrangement as in Fig. 1, with the middle ports made higher and valve controlled to provide for supercharging the cylinder.
Figure 3:
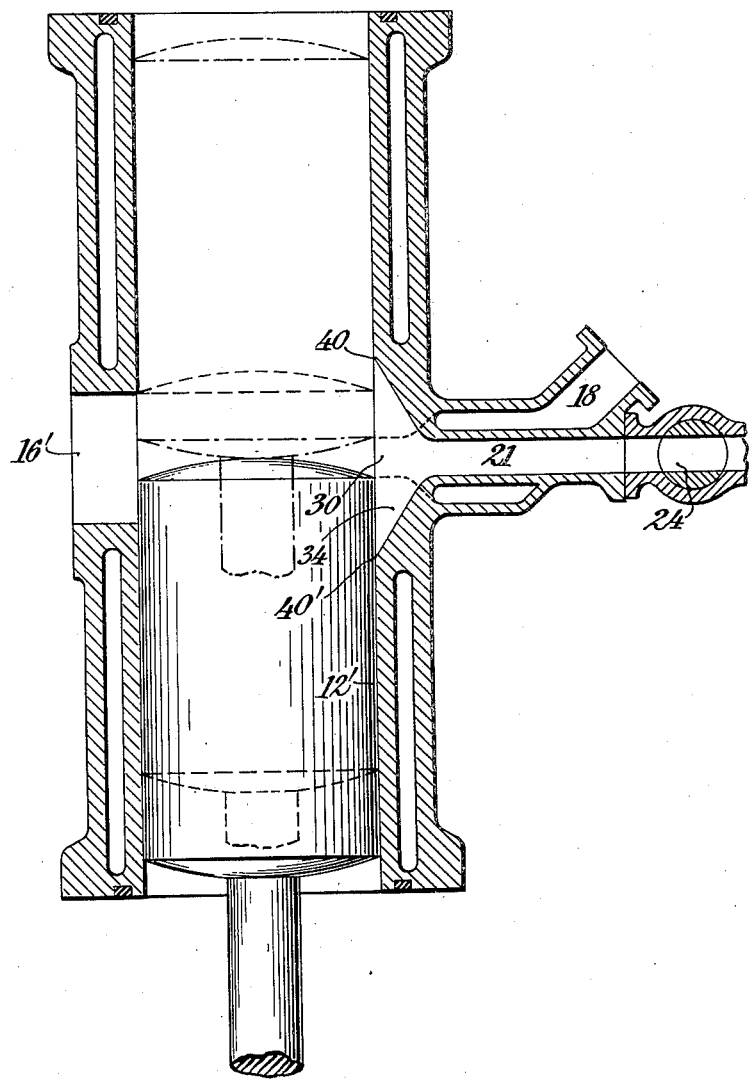
Fig. 3 shows an application to a double-acting engine, arranged for supercharging with air at a pressure higher than the scavenging air pressure.
Figure 10:
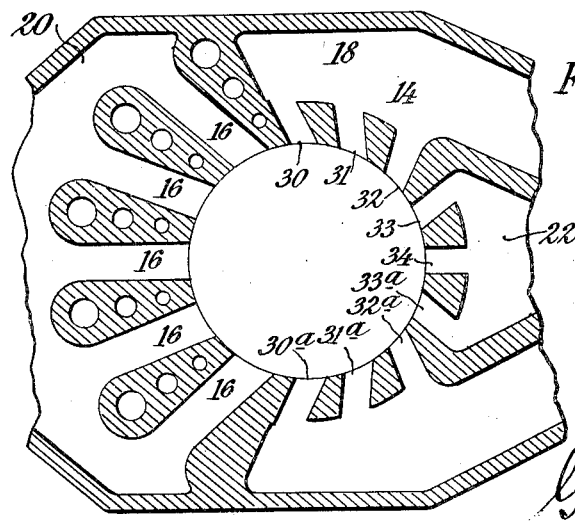

Fig. 10 is a horizontal section through the ports applicable to Figs. 1, 2 and 3.

Referring to said drawings, numeral 10 designates a cylinder of a two-cycle internal combustion engine; numeral 12 a reciprocating piston; numeral 14 a bank of inlet ports located in the cylinder wall in a position to be opened and closed by the piston; and numeral 16 a bank of exhaust ports also located in the cylinder wall on the opposite side in position to be opened and closed by the piston 12.

The bank of inlet ports 14 may be in communication, as illustrated in Fig. 10, with the usual air belt 18. The exhaust ports 16 may also be connected with the usual exhaust belt 20, as illustrated in Fig. 10.

In Figs. 1 and 2 the piston 12 is shown as a single-acting piston, while in Fig. 3 the piston is shown as a double-acting piston and is designated by the numeral 12', the cylinder in Fig. 3 being made longer to accommodate the double acting piston.

In desired cases, the engine may be arranged to receive a supercharge. Two embodiments of such an arrangement are shown, in one of which, Fig. 2, the cylinder is supercharged with the air at the same pressure used for scavenging and in the other, Fig. 3, in which the supercharging is done with air at a higher pressure than the air used for scavenging. In these embodiments the engine is provided with a duct 21 or chamber 22 in communication with the source of compressed air, which duct 21 or chamber 22 is controlled by a valve 24, as will be hereinafter described. In the embodiment of Fig. 2, the chamber communicates with the air belt 18, to which all the air used is supplied, and in the embodiment of Fig. 3, the duct 21 communicates with a separate source of compressed air at a pressure above that in the said belt 18.

Referring to Fig. 10, the bank of inlet ports 14, comprises a number of individual ports 30, 30ª, 31, 31ª, 32, 32ª, 33, 33ª, 34. A greater or less number of these ports may be used. According to the present invention, the port (or ports) in the middle section of the bank, here shown as the port 34, is turned upward at an angle, as for example an angle of 60°, and this port or these ports are arranged more or less radially. The port 34, shown in Fig. 10, is shown in vertical section in Fig. 4.

The ports adjacent to the middle port, as for example the ports 33, 33ª, in Fig. 10, are arranged so as to direct their air streams inside of the cylinder center (see Fig. 10), and are also preferably turned upward at a lesser angle, as for example an angle of 45°. The adjacent ports 33 et seq. are illustrated in vertical section in Fig. 5.

The end ports, here shown as the ports 32, 32ª, 31, 31ª, 30, 30ª, are arranged to direct their streams back toward the side of the cylinder containing the inlet port bank 14, and these ports are at less inclination than the other inlet ports, preferably being horizontal, or approximately horizontal. The ports 30 et seq. are illustrated in vertical section in Fig. 6. By directing the middle port or ports obliquely upward, the tendency of the air streams from these ports to cross the cylinder is lessened and a better union of these streams with the streams coming from the more nearly horizontal end ports is obtained.

In order to obtain a supercharge in the cylinder, this may be readily obtained by arranging one or more of the upwardly-turned ports, and conveniently the middle port (or ports) 34, with its upper edge 40 above the level of the exhaust port 16. By this means, air at superatmospheric pressure may enter the cylinder 10 after the closing of the exhaust port or ports 16 from the chamber 22 or from the duct 21, and thereby supercharge said cylinder. Air from the chamber 22 is received from the air belt 18, air at the same pressure being thereby used for scavenging and supercharging, while air received through duct 21 is at a higher pressure than the air in belt 18. Valve 24, Fig. 2, is provided to close off the passage 21 or chamber 22 from the air supply on the down stroke of the piston 12, the said valve 24 being arranged to later open, conveniently after a drop in pressure of the cylinder gas, and at a time when it is desired to begin the admission of air into the cylinder through the said ports which have their upper edges above the level of the upper edge of the exhaust ports.

The invention may also be embodied in an engine having a double-acting piston, as illustrated in Fig. 3. The middle, adjacent and end inlet ports are of the same relative inclination, as previously described, except that the inclined ports are inclined in opposite directions, as illustrated in Fig. 3, and also in an alternative embodiment on an enlarged scale in Figs. 7, 8 and 9. Referring to Fig. 7, as illustrating the middle port (or ports) 34, this is shown as having an upward and a downward inclination, as illustrated at 44, 45. The adjacent port or ports, as for example the port 33, is illustrated in Fig. 8, and this is shown as having oppositely inclined portions 48, 49. The end ports are preferably arranged horizontally, or approximately horizontally. This is shown in broken line in Fig. 3, and by the port 30, Fig. 9. In Fig. 9 the end ports are shown as having approximately double the length of the ports shown in Fig. 6. The overall port heights in the double-acting embodiments depend on the length of piston and the stroke desired.

The double-acting piston arrangement is, as shown in Fig. 3, adaptable for supercharging. For this purpose, one or more of the middle ports 34 may have its upper edge 40 and its lower edge 40′ extended along the cylinder wall toward the combustion ends a somewhat greater distance than the upper and lower edges of the exhaust port 16′. By this arrangement, as heretofore explained, air under pressure may pass into the cylinder through the said port (or ports) 34, after the exhaust has been cut off. The valve 24 located in the passage 21 cuts off communication through the port 34 during certain parts of the piston movement, as heretofore described.

The invention has been found to give materially higher scavenging efficiencies than other known arrangements, and, due to the use of the horizontal (or approximately horizontal) end ports and oblique ports only in the middle of the bank, the inlet area has not been greatly choked. In fact, the choke due to the obliquity of the middle ports is about the same as would result if all the ports were made horizontal and the middle port of the bank were blocked off or omitted to reduce the tendency to flow across the cylinder.

The general operation is the same as in well known two-cycle engines, and need not here be described.

When the middle ports are to serve as supercharging ports, they must of course be higher than the exhaust ports, as already described.

As shown, except in the case of the upwardly-inclined ports 34 arranged for supercharging with the upper edge 40 (40, 40′) above the edges of the exhaust ports, the exhaust ports 16 (16′) are preferably made longer than the inlet ports, to avoid the use of valves and to provide what drop in pressure is necessary to reduce the cylinder pressure to a pressure below that of the scavenging air prior to the opening of the inlet ports.

The invention is not limited to the use of any particular type of piston head. Some types help the scavenging efficiency as compared with other types, but hurt the shape of the combustion chamber.

A frusto-conical head may be used in certain types of double acting cylinder to coact with the inclined faces of the ports to form the desired opening, as shown in Figs. 7 and 8.

The invention may receive other embodiments than those herein specifically illustrated and described.

What we claim is:—

1. A two-cycle engine comprising a cylinder, a plurality of air inlet ports arranged in a bank on one side of the cylinder, a port in the middle section of the bank arranged to deliver an air stream obliquely toward the cylinder cover, the end or wing ports arranged to deliver air streams more nearly horizontal and toward that side of the cylinder in which the inlet ports are located.

2. A two-cycle engine comprising a cylinder, a substantially continuous bank of air inlet ports on one side of the cylinder, the ports in the middle section of the bank arranged to deliver air streams obliquely toward the cylinder cover, the ports in the end or wing sections of the bank arranged to deliver air streams more nearly horizontal and toward that side of the cylinder in which the inlet port bank is located.

3. A two-cycle engine comprising a cylinder, a plurality of inlet ports arranged in a bank on one side of the cylinder, a port in the middle section of the bank pointing obliquely toward the cylinder cover and radial, the adjacent ports pointing less obliquely toward the cylinder cover and towards a point between the axis of the cylinder and the side of the cylinder wall carrying the ports, the end or wing ports pointing horizontally and toward that side of the cylinder carrying the inlet ports.

4. A double-acting engine according to claim 1, said inlet ports being arranged to serve the top and bottom ends of the cylinder alternately.

5. A two-cycle engine comprising a cylinder, exhaust ports, a bank of air inlet ports on one side of the cylinder, an inlet port in the middle section of the bank higher than the exhaust ports and arranged to deliver an air stream obliquely toward the cylinder cover, a valve for controlling said latter inlet port, the end inlet ports being lower than the exhaust ports and arranged to deliver air streams more nearly horizontally and toward that side of the cylinder in which the inlet ports are located, the arrangement being such that all the inlet ports open after the exhaust ports, that the end inlet ports close before the exhaust ports and the middle inlet port closes after the exhaust ports whereby a supercharge is established in the cylinder.

6. A double-acting engine according to claim 5, the same row of air inlet ports being arranged to serve the upper cylinder and the lower cylinder alternately.

7. An engine according to claim 5, further comprising means for supplying air to the middle ports at higher pressure than the air supply to the end ports.

8. A two-cycle engine comprising a cylinder, a plurality of inlet ports, one of which is arranged to deliver an air stream obliquely upward toward the cylinder cover, and others of which are arranged on each side thereof and arranged to deliver air streams beneath said first-mentioned stream and back toward the side of the cylinder in which said inlet ports are located.

In witness whereof, we have hereunto signed our names.

CHARLES G. CURTIS.
EARLE R. NEWTON.